US008639268B2

(12) United States Patent
Mihaly

(10) Patent No.: US 8,639,268 B2
(45) Date of Patent: Jan. 28, 2014

(54) LOCATION AWARE PRE-CACHING AND SERVICE DELIVERY

(75) Inventor: Attila Mihaly, Dunakeszi (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 55 days.

(21) Appl. No.: 13/252,992

(22) Filed: Oct. 4, 2011

(65) Prior Publication Data

US 2013/0084883 A1 Apr. 4, 2013

(51) Int. Cl.
*H04W 24/00* (2009.01)

(52) U.S. Cl.
USPC ............... 455/456.3; 455/446; 455/426.2; 455/432.1; 455/466; 455/456.1; 370/338; 705/14.52; 705/14.57

(58) Field of Classification Search
USPC ............ 455/456.1, 414.1, 432.1, 466, 418, 455/426.2, 436, 446; 370/328–338; 705/14.52, 14.57
See application file for complete search history.

(56) References Cited

U.S. PATENT DOCUMENTS

| 7,013,149 | B2 | 3/2006 | Vetro | |
|---|---|---|---|---|
| 2002/0174227 | A1* | 11/2002 | Hartsell et al. | 709/226 |
| 2004/0192342 | A1* | 9/2004 | Ranganathan | 455/456.1 |
| 2007/0089110 | A1* | 4/2007 | Li | 717/178 |
| 2011/0116395 | A1* | 5/2011 | Tsuda | 370/252 |
| 2011/0131290 | A1* | 6/2011 | Kim et al. | 709/217 |
| 2011/0145317 | A1* | 6/2011 | Serban et al. | 709/203 |
| 2013/0018978 | A1* | 1/2013 | Crowe et al. | 709/214 |

FOREIGN PATENT DOCUMENTS

EP 2088 737 * 8/2009

OTHER PUBLICATIONS

3GPP TS 23.401 V9.1.0, General Packet Radio Service enhancements for Evolved Universal Terrestrial Radio Access Network (Jun. 2009).
3GPP TS 23.246 V9.5.0 Multimedia Broadcast/Multicast Service (MBMS) Architecture and Functional Description (Jun. 2010).

* cited by examiner

*Primary Examiner* — Mahendra Patel
*Assistant Examiner* — Quan M Hua
(74) *Attorney, Agent, or Firm* — Potomac Patent Group PLLC

(57) ABSTRACT

A mobile communication network includes a media controller (MC) for tracking popularity statistics of cells of the network, a location database (LDB) connected to the MC for storing the statistics, a position monitor (PM) connected to the MC for detecting a position of subscribers within the network and at least one local cache (LC) connected to the MC and for pre-storing content to be delivered to the subscribers wherein the MC further includes a communication means for receiving content and subscriber information and for communicating portions of the received information to the PM, to the LDB and to the LC.

17 Claims, 6 Drawing Sheets

LOCATION AWARE PRE-CACHING AND SERVICE DELIVERY

TECHNICAL FIELD

The invention is related to 3GPP ($3^{rd}$ generation partnership project) access networks and more particularly to caching on these networks.

BACKGROUND

A simplified 3GPP network combining legacy 2G and 3G networks with a LTE (long term evolution) architecture is illustrated in FIG. 1. In LTE, the radio resources for the bearers are controlled by the RBS (radio base station) node (eNodeB). In 2G/3G networks, the radio resources for the bearers are controlled in the RNC (radio network controller) nodes.

The QoS (quality of service), policy and charging control in EPC (evolved packet core) networks is typically performed by the PCRF (policy and charging resource function) entity. In principle, other nodes such as PGW (packet data network gateway or PDN gateway) can also perform basic policy control actions. In a LTE network, initiated QoS is supported where the operator service network initiates the setup of a new bearer. The setup is initiated with a PDP (packet data protocol) context towards the PCRF that specifies the flow descriptors, the application and the QoS requirement. The PCRF then makes the policy decision and downloads the rule for the new bearers to the PGW which initiates the new bearer setup procedure.

According to this procedure, a new bearer is set up or the existing bearer is modified for each subscriber upon a new content request (regardless of whether the PCRF is involved). However, such types of point-to-point delivery service do not scale well. The resources needed to distribute the content increase proportionally with the number of subscribers and the size of the transferred content. This is particularly inefficient for on-line streaming services and 'push' services such as, for example, SMS (short message service), WAP-push (Wireless Application Protocol), podcast etc., where many subscribers request the same content.

It is possible to simultaneously deliver multimedia content to a number of users in a specific location (ranging from one cell up to the entire network) through the use of MBMS (multicast-broadcast multimedia service) push service, which is a broadcast service tailored for mobile networks. While MBMS solves the scalability problem of content delivery, it is still suboptimal for a number of different reasons listed below:

(i) The timing of content delivery is critical. On one hand, the content broadcast should take place when most of the subscribers to the content are reachable (i.e. accessible). That is, it is dangerous to use the would-be most optimal period of night hours for content download. On the other hand, for some content types (e.g., news) the time gap between the content creation and delivery time may be very short;

(ii) During the content delivery, certain subscribers to push services are out-of the radio range (i.e. "unreachable" or not accessible) or have bad radio conditions which would trigger a large number of subsequent point-to-point file-repair procedures which degrades the network efficiency and jeopardizes the delivery of the content in due time; and (iii) Upon the start of (streamed media) content delivery by MBMS systems, there could be many subscribers with bad radio coverage. That is, the QoS bearers for the media delivery cannot be setup for a large fraction of subscribers resulting in a bad grade of service (GoS).

In order to, at least partially, overcome these issues, a mechanism that is aware of the subscribers' environmental conditions during content delivery is needed. An architecture that can facilitate such functionality has been proposed by A. Vetro, et al., in U.S. Pat. No. 7,013,149 B2. It is based on a central entity called an application service provider (ASP). The ASP of Vetro controls the delivery of multimedia services based on environmental information such as location parameters, network conditions, delivery capabilities, time parameters and subscriber mobility characteristics. The architecture of Vetro is illustrated in FIG. 2.

As described in Vetro (referring to FIG. 2), mobile terminal devices 205 (e.g., cellular phones and portable computing devices) are connected to a service manager 210 and an application service provider (ASP) 220 via an access network 230. The access network 230 can include wired and wireless portions and there can be multiple ASPs (e.g., local businesses, government agencies, etc.) in a particular locale. The characteristics of different networks are expressed in terms of capacity, available bandwidth, error characteristics and latency. Each mobile device is characterized by different capabilities, such as the multimedia formats that the device can receive, as well as processing and display constraints.

The location of a particular mobile device is determined by a geolocation component 240 which can be part of the network 230. An environment description 250 generated by the ASP 220 includes the location of the mobile device, the characteristics of the device and network, and other factors of the usage environment. A description parser 260 parses the environment description 250 with a schema or grammar 270. This provides a consistent interface which can be processed in a predictable manner. The parsed environment description is available to the service manager 210. The service manager 210 maintains a database 280. The service manager or ASP 220 allows authenticated devices to access multimedia services stored in the database 280.

Vetro, however, also has some drawbacks such as: (1) The efficiency issues regarding the service delivery still exist due to the personalized nature of the service; (2) The architecture of Vetro requires dynamic per-subscriber statistics signalling and storage which raises scalability issues in a real network with a high number of subscribers and content; (3) The content transfer generally takes place between the application service provider and the mobile device when conditions for content delivery are fulfilled by the current environment description. If a good match cannot be found, then the content manager attempts to satisfy the content transfer by itself. In order to accomplish this, the content is pre-stored in the database. Since both the database and the service provider's server are centrally placed, all content delivery will load the access backhaul. It is not possible with this method to offload the mobile access backhaul; and (4) Since the control is located in the core network, it is also not possible to get instantaneous feedback of the available radio resources in order to achieve a spectrum-efficient content scheduling.

What is desired, therefore, is a method and apparatus for overcoming the limitations described above.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with an exemplary embodiment, a mobile communication network is disclosed. The network comprises: a media controller (MC) for tracking popularity statistics of cells of the network; a location database (LDB) connected to the MC for storing the statistics; a position monitor (PM) connected to the MC for detecting a position of subscribers within the network; and at least one local cache (LC) connected to the MC and for pre-storing content to be delivered to the subscribers, wherein the MC comprises: a communication means for receiving content and subscriber information and for communicating portions of the received information to the PM, to the LDB and to the LC.

In accordance with another exemplary embodiment, a method of delivering content to a subscriber in mobile communication network is disclosed. The method comprises: receiving content identification, subscriber identification and environmental parameters by a media controller (MC); communicating the subscriber identification and related environmental parameters to a position monitor (PM) for monitoring a subscriber corresponding to the subscriber identification; communicating content identification and related environmental parameters to a location database (LDB); receiving identification and delivery time of content by the MC; obtaining a list of cells and subscriber and download statistics for each of the cells for the identified content from the LDB; identifying a list of local caches (LCs) corresponding to one or more of the cells in the list for receiving content; receiving notification of presence of a subscriber in a cell corresponding to one of the LCs; and informing the LC of the presence of the subscriber in a corresponding cell in order to deliver content to the subscriber.

In accordance with a yet further embodiment, a media controller (MC) in a mobile communication network is disclosed. The media controller comprises: a communication means for receiving content and subscriber information and for communicating portions of the received information to a position monitor (PM), to a location database (LDB) and to a local cache (LC) wherein the MC tracks popularity statistics of cells of the network, the PM detects position of subscribers within the network and the LC pre-stores content to be delivered to the subscribers at a pre-determined time.

BRIEF DESCRIPTION OF THE DRAWINGS

The objects and advantages of the invention will be understood by reading the following detailed description in conjunction with the drawings in which.

DETAILED DESCRIPTION

Figure 1:
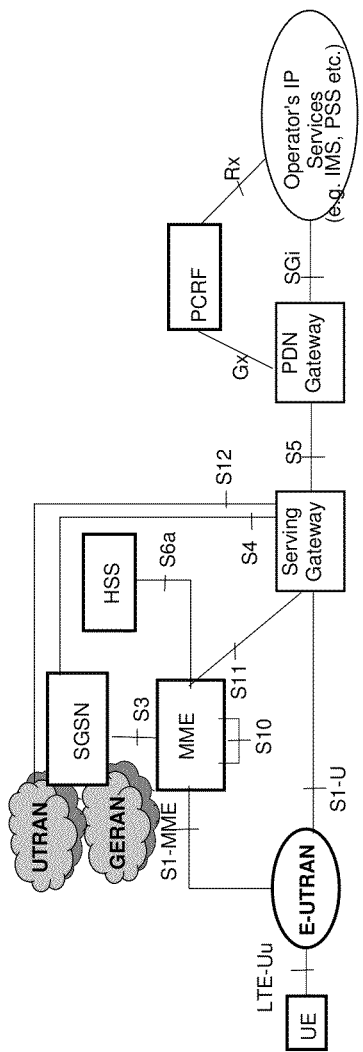
FIG. 1 illustrates an exemplary 3GPP network architecture.
Figure 2:
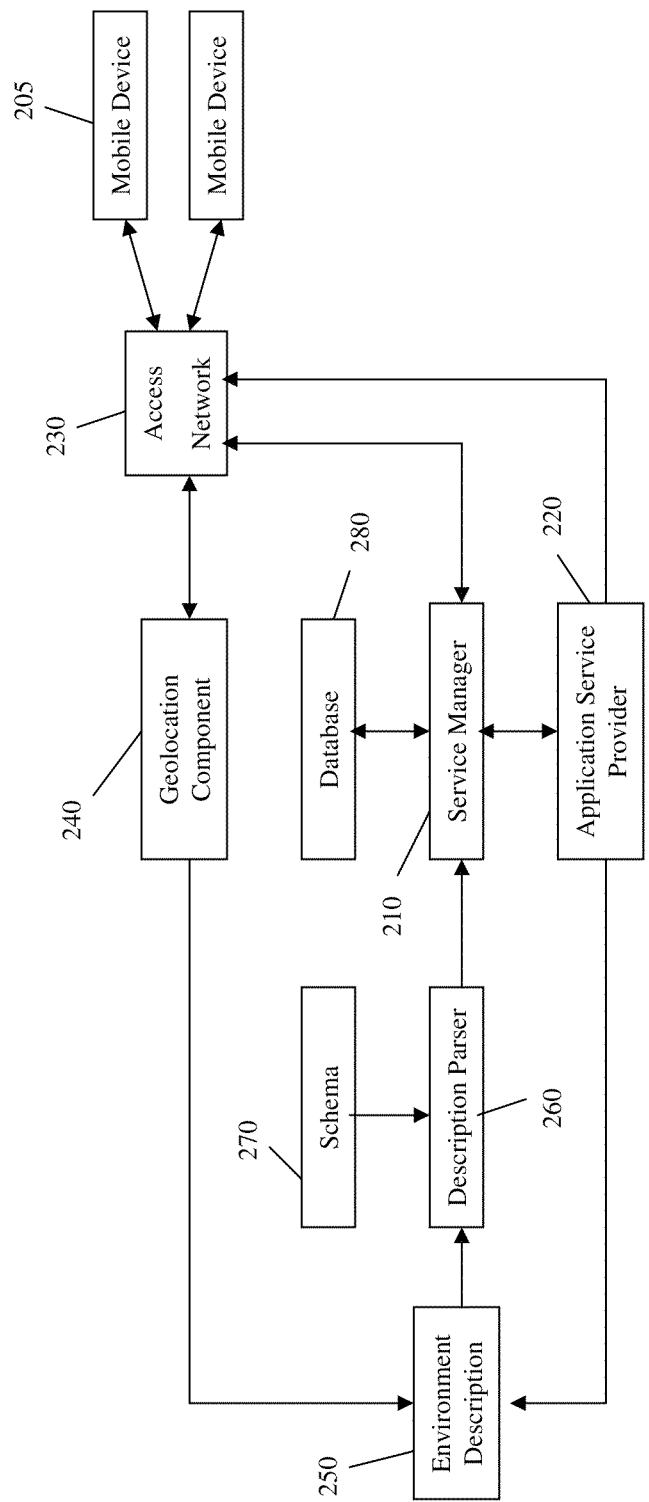
FIG. 2 illustrates an existing environment aware system for mobile devices.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors).

Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In exemplary embodiments, methods, apparatus and systems are disclosed for content delivery services that are capable of efficient traffic reduction of the mobile backhaul and utilization of the radio resources while also minimizing the number of rejected or degraded content delivery. Exemplary methods are directed to delivering content that is based on monitoring the subscriber whereabouts and pushing the content closer to subscriber which makes it possible to serve it in a reliable and resource-efficient manner.

Exemplary embodiments provide a solution for location-aware pre-caching and delivery of subscribed content in mobile networks. An entity for facilitating such a solution may be a media controller (MC) that, in cooperation with a position monitor (PM), may keep track of the popularity statistics of the cells relative to the most important subscription services. The term 'important' in this context may refer to the number of subscriptions to a particular service or content and also of the total amount of data to be transferred.

The popularity statistics may include, for example, which cells and at which time are populated by most of the impacted subscribers (i.e. those subscribing to a particular service). In the case of regularly delivered content, this may be extended to download popularity statistics (i.e., how many times a given content has been previously served in the area of a given cell). This information (i.e. the popularity statistics) may be stored in a location database. Based on this information, a decision may be made to pre-populate the local caches with the content. The local caches may then serve the content in a QoE, transport and radio efficient manner upon being informed about the appearance (i.e. presence or location) of a new subscriber in the cell range.

Exemplary embodiments may be described with reference to high level architecture 300 of FIG. 3 in which a media controller 310 may interface with an application server (AS) 320, location database (LDB) 330, position monitor (PM) 340 and local cache(s) (LC) 350. AS 320 and LC 350 may interface with PCRF 360. These components (i.e. MC, LDB, PM, AS and LCs) may be implemented within a network for example.

During a preparation phase, MC 310 may be informed about the subscription services that are to be delivered or controlled. MC 310 may interface with application server AS 320 to obtain the information about new content to be delivered together with the information about the subscribers it should be delivered to, as illustrated in the timing diagram of FIG. 4. AS 320 may be one entity from which to receive this information by MC. In some embodiments, this can be directly configured by the operations and management—this may be the case of an external AS 320 which may not know who to inform and a subscriber's internal identifier. If the media controller is included in a mobile management entity (MME), this information could be also conveyed through the home subscriber service (HSS) to MME (MC may also have this information since it is included in MME). Certain subscription information may be stored in the HSS. In some embodiments, media-related information may be pre-configured in MC 310.

MC 310 may obtain (from AS 320) content ID, subscriber ID(s) and certain environmental parameters that are characteristic to the delivery of the media (corresponding to the content ID). These parameters may include location parameters if the delivery is restricted to certain cells, relative priority (i.e. relative to other services or other content) of the delivery of this media or time parameters related to the delivery of this media for example (such as a deadline by which to deliver this media for example).

Subscriber ID(s) that are to be monitored and the parameters may be provided by MC 310 to a position monitor 340. Position monitor 340 may monitor the particular subscribers that are identified by the subscriber ID(s).

MC 310 may notify location database 330 to create a new record for the content ID and environmental parameters. MC 310 may also notify AS 320 of receipt of the content ID and related information (i.e. subscriber IDs, environmental parameters).

Figure 5:
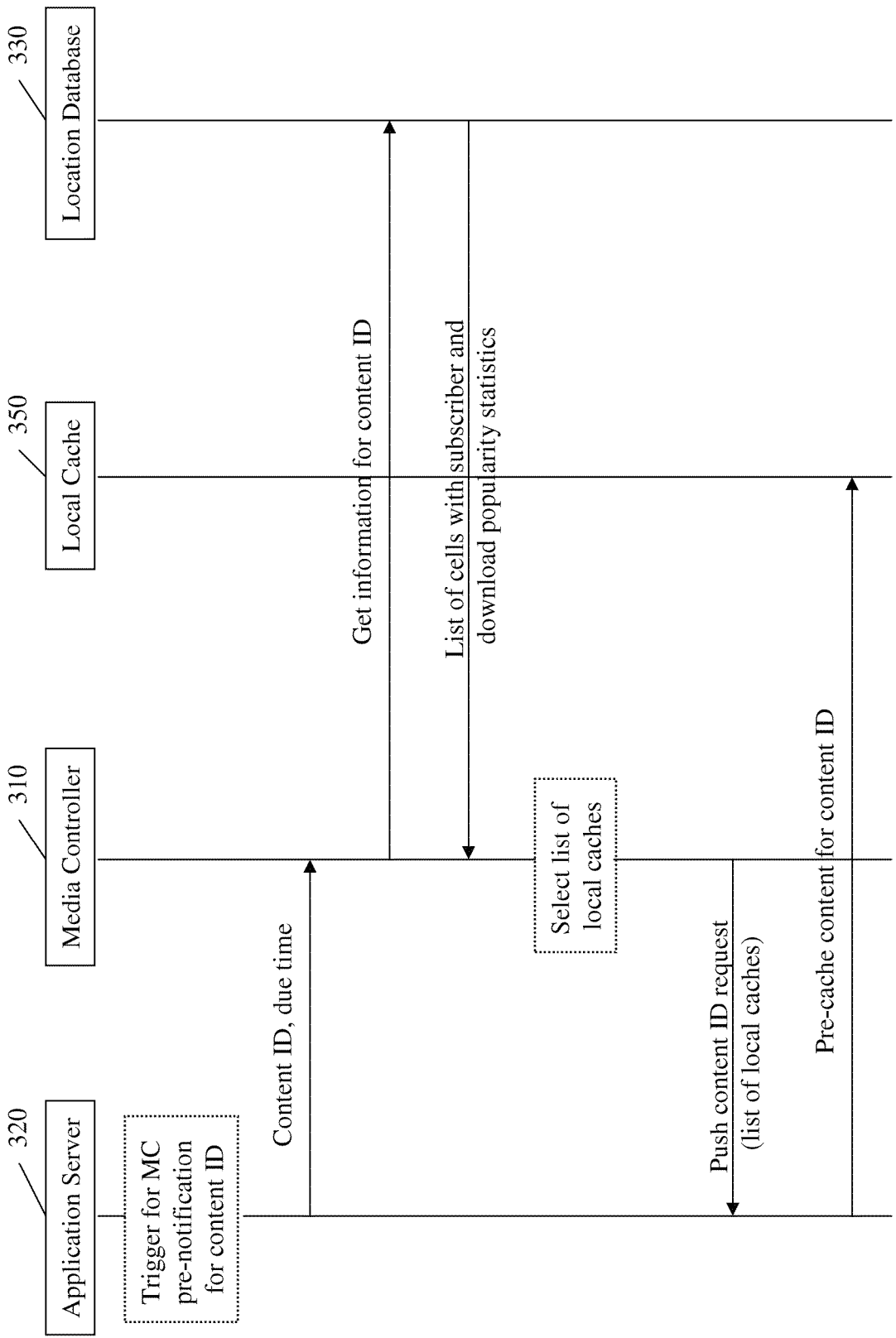
FIG. 5 illustrates a timing diagram for content pre-caching in local caches mediated by a media controller in accordance with exemplary embodiments.

During a pre-caching phase, local cache(s) 350 may be populated with the content that is likely to be requested from the cell(s). The estimates for the likelihood can be based on historical (download) popularity statistics for the given cells—the historical popularity statistics may be available from location database 330 that is maintained by MC 310. An example of such a method or process is illustrated in the timing diagram FIG. 5.

The process may be initiated by AS 320 that notifies MC 310 about the content that is to be served and the time at which it is to be served. The triggering event for the notification may be a pre-defined time before the due time of serving the content (i.e. before the time at which content is to be served or delivery deadline).

Upon receiving the notification (such as content ID and due time) from AS 320, MC 310 may obtain information about the content ID from location database 330 (by issuing a request to the location database 330). Location database 330 may provide a list of cells with subscriber ID(s) and download popularity statistics (for each cell) to MC 310 based on historical information for example. Based on the information received from LDB 330, MC 310 may then select a list of local cache(s) 350 that are to receive the current instance of the content. A local cache may correspond to more than one cell. MC 310 may issue a command message to AS 320 that specifies the content that should be pre-cached (i.e. pushed) and the local cache (from the local cache list) to which the content is to be pushed. AS 320 may push the content to the selected local cache(s) 350. A connectivity may exist between AS 320 and LC 350 that can be accomplished on a IP network by, for example, a public IP address on a IP network or private LC addresses pre-configured by a NAT in a network.

In the case of regularly served content type (e.g., evening news), MC 310 may autonomously decide when to initiate local caching of the current instance of the content. In this case, besides simple cell statistics of subscriber whereabouts, the statistics on when, where and how many times the given type of content was downloaded previously also provides useful information.

Figure 6:
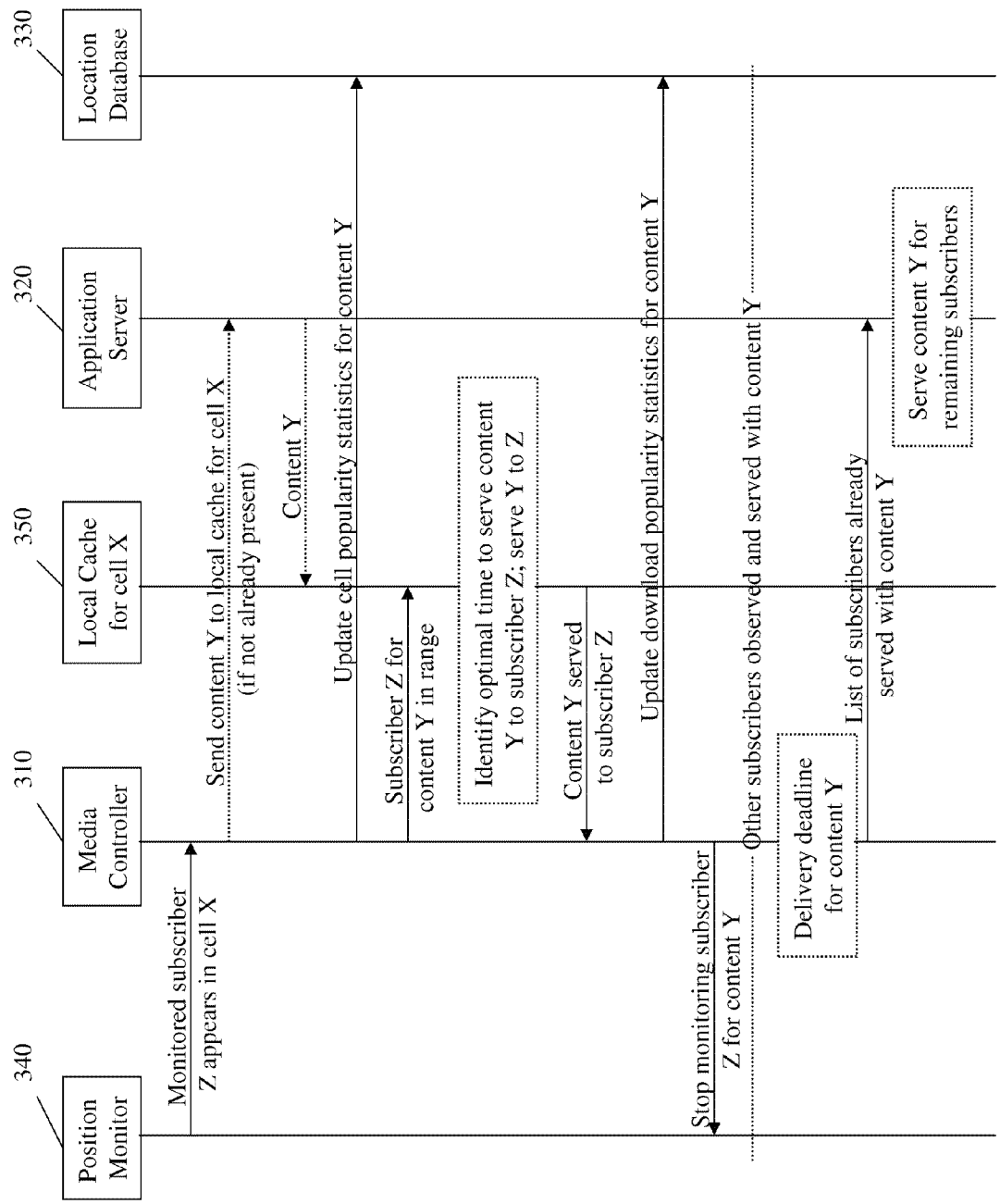
FIG. 6 illustrates a timing diagram for serving content from local caches in accordance with exemplary embodiments.

A media delivery process according to exemplary embodiments is illustrated in the timing diagram of FIG. 6. The position monitor 340 monitors for or detects the presence of a subscriber in cell X (i.e. subscriber Z who is subscribed to content Y is in range of cell X). In some embodiments, position monitor 340 may be embedded in a mobility management entity (MME) that can infer terminal subscription to certain services from the HSS.

Position monitor 340 notifies MC 310 of subscriber Z being in cell X. If content Y is not already at the local cache 350, MC 310 may instruct AS 320 to submit the content to the local cache 350. AS 320 may submit or forward the content (i.e. content Y) to local cache 350. MC 310 updates cell popularity statistics for content Y in location database 330. The statistics could include the number of subscribers for content Y within cell X. They could also include a list of subscriber IDs that have appeared in the cell range. Such information can be used to track the mobility of a specific subscriber and to determine the best place to serve the content by the local cache.

MC 310 also notifies local cache 350 about subscriber Z to content Y being within cell X. MC 310 may further specify a deadline parameter related to when the content is to be delivered, particularly if the same content has different delivery deadlines for different subscribers. An optimal time for serving content Y to subscriber Z may be determined by local cache based on current and historical radio conditions versus the delivery deadline for the given content. The content may be served (by the local cache) to subscriber Z at the determined optimal time. Local cache 350 may then notify MC 310 of subscriber Z having been served content Y. MC 310 may update download popularity statistics for content Y to location database 330 including, for example, identity of individual subscriber(s)/IDs that have downloaded the particular content. Since content Y has been served to subscriber Z, MC 310 may notify position monitor 340 to stop monitoring subscriber Z for content Y.

As the deadline for delivery or serving of content Y approaches, a list of all subscribers that have been served content Y may be provided by MC 310 to AS 320. AS 320 may then serve content Y to those subscribers that have not been served. There exist methods for AS to serve content to subscribers with a desired QoS/QoE (quality of service/experience). Adequate resources for facilitating such a transfer may be requested from the PCRF which may, based on subscriber-specific policy, grant these resources and order an adequate QoS bearer over the mobile network. Only a small percentage of content may be served in this manner as exemplary embodiments provide for delivering content to local caches ahead of delivery deadlines, etc.

The process as described with respect to FIG. 6 provides an identification of the best (i.e. optimal) spot for downloading content by the local cache which results in utilizing radio resources in an efficient manner and improving the subscriber QoE. If a given subscriber is not served from the local cache, for moving subscribers, multiple local caches along the subscriber's moving path can be scheduled to download the content to the subscriber. If this also proves to be not feasible, the content may be served upon the request of the central application server (i.e. AS 320) using bearers having guaranteed QoS.

Figure 3:
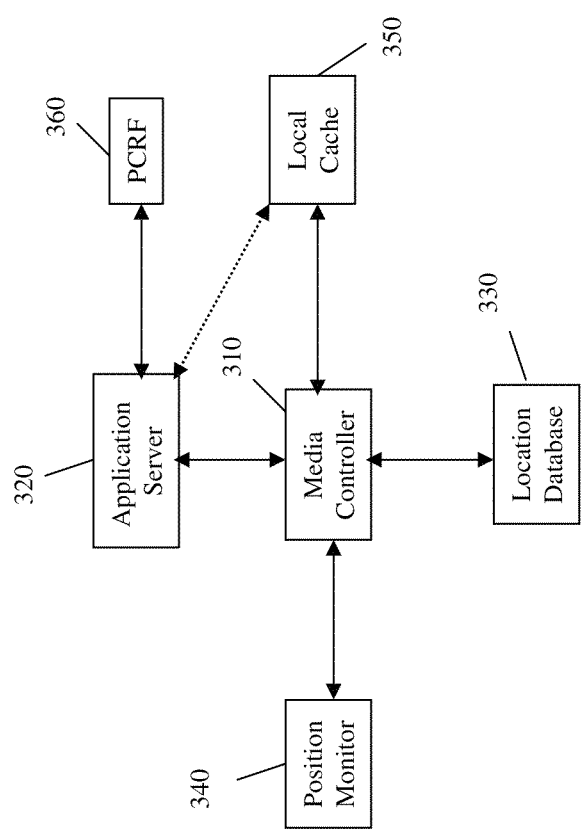
FIG. 3 illustrates a high-level architecture in accordance with exemplary embodiments.

The architecture in FIG. 3 may be implemented as an 'overlay' to the network of FIG. 1 by inserting, for example, additional logical functions and interfaces in the network. The functions may include, for example, application server 320 and position monitor 340. The UE(s) (of FIG. 1) communicate with the Internet and with each other through tunnels established towards the serving gateway and PDN gateway.

The MME is in charge of establishing these tunnels and re-establishing them when UEs move to another access point (RBS). Thus, the MMEs are aware of a UE's current position (unless the UE is idle which is described above) and therefore, may serve as the position monitor for the MC. HSS already stores some information about the services a certain subscriber (IMSI) is connected to, and thus it may serve as the application server (AS) for certain services.

The location database 330 as implemented according to exemplary embodiments may contain information about the popularity statistics of the different cells relative to a certain service. For example, in one form, it may appear as the location table shown in TABLE 1 that stores aggregate per-cell statistical information about the number of subscribers to a given service or content appearing within the range of that cell. This table illustrates a total number of occurrences of subscribers to a certain service per eNodeB. For regularly served content, MC 310 may reset these values after the delivery deadline has elapsed and the content has been served by AS 320.

In a more general form, the location database may contain (but is not restricted to), for each content: (1) The list of eNodeBs/cells allowed deliver a certain content (e.g., for location-based services); (2) the timestamps of subscriber occurrence in the cell range in the past; (3) timestamps of content delivery from the given cell for each eNodeB/cell; and (4) dwelling time information.

Figure 4:
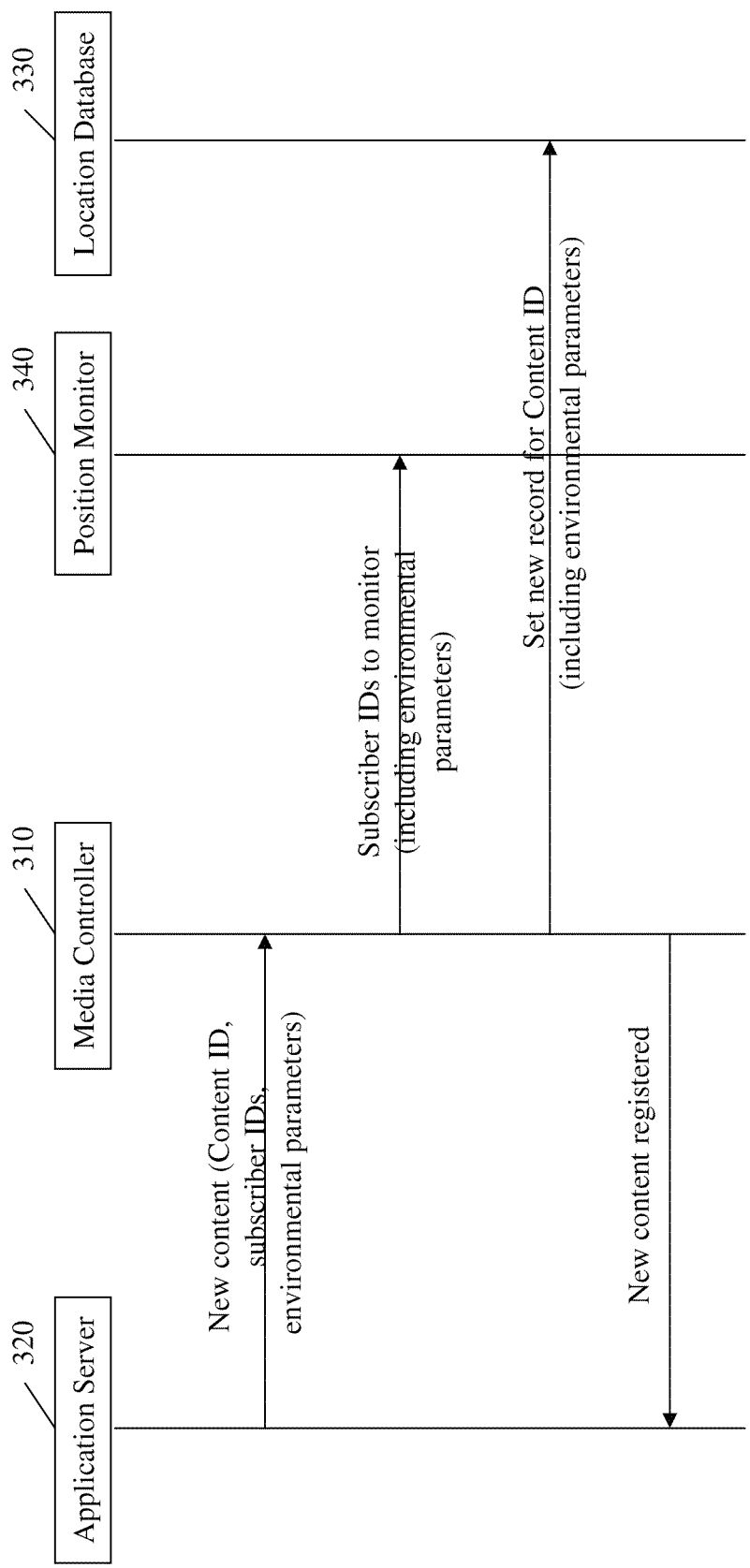
FIG. 4 illustrates a timing diagram for location database update with new content in accordance with exemplary embodiments.

Location database 330 may be maintained by MC 310 based on information received from position monitor 340 comprising adding new records (as illustrated in FIGS. 4 and 6 for example), or removing records based on age or explicit request. MC 310 may then use the recorded data to calculate historical statistics (such as the moving average, for the last 24 hours, etc.) which can be used to identify the local cache(s) 350 that are to be populated and the times at which to populate the identified local cache(s).

In some embodiments, the position monitor 340 may be part of, or interface with, the MME. An advantage of such an implementation is that the MME can infer user position from standard signalling events occurring between the terminal and the core network such as, for example, tracking area updates (TAUs), network attach messaging, service requests, page responses, and/or handovers between radio network nodes.

Upon terminal attachment, the MME may infer terminal subscription to certain services from the HSS and may enquire MC 320 whether location statistics for this service should be monitored. The MME may then set a flag for the terminal indicating that its location should be monitored and registered in location database 330.

Since the client (i.e. terminal) may move and go idle from time to time, it may pose a challenge for position monitor 340 to track the UE (i.e. terminal) and activate the UE.

Tracking a UE may include identifying the UE's current cell. If the functionality of position monitor 340 is implemented in the MME, this may be an issue when the UE is in idle mode. The radio access network (RAN) states for its (i.e. for the UE) bearers/PDP contexts are removed when the UE goes to the idle mode. Thus, the MME will not have knowledge about the UE's location (i.e. MME does not know known which cell the UE is currently in). This will also be valid for the position monitor if it is implemented in the MME.

Activating a UE means that it may include making it (i.e. the UE) capable of receiving content from the local cache. This may be an issue when the UE is in an idle mode and the local cache resides in the RAN. Otherwise, any traffic sent to the UE would trigger a standard page procedure activating the UE and setting up the RAN states.

These may be overcome by at least one of two approaches. According to one approach, the UE may be prevented from going into the idle mode. This could easily be controlled by the MME since the MME is in charge of initiation of the deactivation procedure. That is, when the MME is notified about which users should be monitored, those UEs that are to be monitored will not be allowed to go to idle mode until further notification.

Another approach may be based on the MME allowing the UE to enter the idle mode. The MME may configure the UEs (that are to be monitored) with a smaller periodic (i.e. more frequent update events) tracking area update (TAU) timer values (such as, one minute for example). TAUs may also be sent in UE idle mode. Upon each TAU, the MME may know the cell information (such as EGCI for example) and may notify MC 310. With this approach, when the local cache decides about the content delivery, it should first send a notification to the MME (with embedded position monitor functionality) in order for the MME to page the UE and re-establish the RAN states.

Referring to the dwelling time information of TABLE 1, many users may pass through a cell on a freeway but the time they spend (within that cell) may be too short to complete a download and, in such cases, the dwelling time must be used when planning the download. This may be accomplished either as additional records besides each occurrence or just counting that occurrence which has exceeded a pre-defined time. The dwelling times may be provided by the position monitor (in addition to the position information).

TABLE 1

| Content ID/type | Number of occurrences in the last period | | | |
| --- | --- | --- | --- | --- |
| | eNodeB_1 | eNodeB_2 | ... | eNodeB_N |
| Evening_news | 9 | 0 | ... | 12 |
| ... | ... | ... | ... | ... |

In some embodiments, the location database may also store UE-specific location information. This may include identity of subscribers of a given content that have recently been 'seen' in the area of a given eNodeB or cell, if and when any content has been delivered to the identified subscribers, etc. This information may assist MC 310 in performing load balancing between the eNodeBs and scheduling certain subscribers at a local cache where they are likely to experience better radio quality. Historical radio performance statistics from certain eNodeBs may also be stored (if scalability is not a concern).

In other embodiments, a local cache may serve partial content. In this scenario, the feedback message from the local cache may include information about which segments (of the content) have been served and storing this information in a local database (that can be part of the location database for example in which case more records may be needed than those shown in Table 1). Upon subscriber movement or at time of closing (i.e. when the delivery deadline is approaching), the next local cache or AS may be informed about the segments that have already been served and the next local cache may start to serve the remaining parts.

Exemplary embodiments may be implemented both in the framework of EPC and pure 2G or 3G networks. In LTE, the position monitor may be placed in MME and the local caches in the eNodeBs. In 2G/3G, the position monitor may be placed in the serving GPRS support node (SGSN) and the local caches may be placed in the RNC/BSCs (base station controllers).

In LTE, the eNodeBs control radio resources. However, this does not preclude a scenario in which a local cache resides further up in the aggregation level. In this scenario, the eNodeBs provide radio feedback to this node. This node may then only send that much content which ensures that the cells are not overloaded. In case of a UMTS/HSPA network, the radio control is performed in the RNCs. Thus, the local caches should be located in the RNCs or above. In case of 2G, the control is in the BSCs. The LC should receive radio information from eNodeBs (in LTE) or RNCs/BSCs (in 3G/2G) respectively. However, there are difficulties to interface to these nodes if the LC is located far apart such as, for example, somewhere in the core. In exemplary embodiments, the LC and the control nodes may be co-located in the same site or even in the same node.

Several advantages may be realized by exemplary embodiments. These include: spared transport capacity through using pre-caching of content which can facilitate usage of background bearers and multicast trees when populating the local caches; Improved QoE through the usage of local cache and information about available radio resources; Improved spectrum efficiency through the knowledge of the available radio resources when serving the content from the local cache—usage of MBMS for simultaneously serving the same content for multiple users in the same cell; Support for location-aware service delivery; and Support for network provisioning based on the information stored in the location database.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A mobile communication network comprising:
a media controller (MC) for tracking popularity statistics of cells of the network;
a location database (LDB) connected to the MC for storing the statistics;
a position monitor (PM) connected to the MC for detecting a position of subscribers within the network; and
at least one local cache (LC) connected to the MC and for pre-storing content to be delivered to the subscribers, wherein the MC:
receives content and subscriber information and communicates portions of the received information to the PM, to the LDB and to the LC, wherein
the information received by the MC includes content identification, subscriber identification and environmental parameters characteristic to delivery of media corresponding to the identified content, said parameters including location parameters for restricting delivery of content to pre-determined cells and by a pre-determined time,
the MC transmits identification of subscribers and environmental parameters to the PM and the PM monitors the location of the identified subscribers,
the MC instructs the LDB to set a new record for the received content identification and related parameters,
the MC receives content identification and a delivery time for delivering the identified content to the subscribers, and
the MC requests information from the LDB for the identified content and the LDB provides a list of cells and subscriber and download popularity statistics for each of the cells to the MC based on historical information.

2. The network of claim 1, further comprising an application server (AS) for submitting the content and subscriber information to the MC.

3. The network of claim 1, wherein the MC selects a list of local caches based on the information received from the LDB.

4. The network of claim 3, wherein the list of local caches is submitted to an application server (AS) and the AS submits content for the content ID to the local caches in the list.

5. The network of claim 4, wherein the MC receives notification from the PM of a presence of the subscriber in a particular cell and the MC notifies the presence of the subscriber to a LC corresponding to the cell.

6. The network of claim 5, wherein the LC serves the content to the subscriber.

7. The network of claim 5, wherein the MC updates cell and download popularity statistics for the content to the LDB.

8. A method of delivering content to a subscriber in a mobile communication network comprising:
receiving content identification, subscriber identification and environmental parameters by a media controller (MC);
communicating the subscriber identification and related environmental parameters to a position monitor (PM) for monitoring a subscriber corresponding to the subscriber identification;
communicating content identification and related environmental parameters to a location database (LDB);
receiving identification and delivery time of content by the MC for delivery to the subscriber;
obtaining a list of cells and subscriber and download statistics for each of the cells for the identified content based on historical information from the LDB in response to a request from the MC to the LDB for the identified content;
identifying a list of local caches (LCs) corresponding to one or more of the cells in the list for receiving content;
receiving notification of presence of a subscriber in a cell corresponding to one of the LCs; and
informing the LC of the presence of the subscriber in a corresponding cell in order to deliver content to the subscriber.

9. The method of claim 8, wherein the content identification, subscriber identification and environmental parameters are received from an application server (AS).

10. The method of claim 9, wherein the AS delivers content to the LCs.

11. The method of claim 9, wherein the MC submits a list of subscribers that have been served with content to the AS.

12. The method of claim 9, wherein the AS serves content to subscribers not on the list received from the MC.

13. The method of claim 8, wherein the information is communicated to the LDB to set a record for the content identification.

14. The method of claim 8, wherein the subscriber presence notification is received from the PM.

15. The method of claim 8, wherein the LC identifies an optimal time for delivering the content to the subscriber.

16. The method of claim 8, wherein the MC updates the LCB with cell popularity statistics and download popularity statistics of the delivered content.

17. A media controller (MC) in a mobile communication network comprising:
   a plurality of communication interfaces wherein
   the media controller receives content identification, subscriber identification and environmental parameters including delivery time for delivering the identified content to a subscriber from an application server (AS) via one of the plurality of interfaces and communicates:
   subscriber identification and related environmental parameters to a position monitor (PM) for monitoring a subscriber corresponding to the subscriber identification,
   content identification and related environmental parameters to a location database (LDB), and to a local cache (LC) wherein
   the MC tracks popularity statistics of cells of the network,
   the PM detects position of subscribers within the network, and
   the LC pre-stores content to be delivered to the subscribers at a predetermined time and
   the LDB provides a list of cells and subscriber and download statistics for each of the cells to the MC based on historical information.

* * * * *

UNITED STATES PATENT AND TRADEMARK OFFICE
CERTIFICATE OF CORRECTION

PATENT NO. : 8,639,268 B2
APPLICATION NO. : 13/252992
DATED : January 28, 2014
INVENTOR(S) : Mihály Page 1 of 1

It is certified that error appears in the above-identified patent and that said Letters Patent is hereby corrected as shown below:

On the title page

Item 12, under "United States Patent", in Column 1, Line 2, delete "Mihaly" and insert -- Mihály --, therefor.

Item 75, under "Inventors", in Column 1, Line 1, delete "Mihaly," and insert -- Mihály, --, therefor.

In the specification

In Column 7, Line 58, delete "MC 320" and insert -- MC 310 --, therefor.

In the claims

In Column 12, Line 13, in Claim 17, delete "time and" and insert -- time, and --, therefor.

Signed and Sealed this
Nineteenth Day of April, 2016

Michelle K. Lee
*Director of the United States Patent and Trademark Office*